United States Patent
Wang et al.

(10) Patent No.: US 11,835,829 B2
(45) Date of Patent: Dec. 5, 2023

(54) DISPLAY SUBSTRATE HAVING DUMMY PIXEL, DISPLAY PANEL, AND ELECTRONIC DEVICE

(71) Applicants: CHONGQING BOE OPTOELECTRONICS TECHNOLOGY CO., LTD., Chongqing (CN); BOE TECHNOLOGY GROUP CO., LTD., Beijing (CN)

(72) Inventors: Wu Wang, Beijing (CN); Meicun Jiang, Beijing (CN); Xiaoyuan Wang, Beijing (CN); Ruilin Bi, Beijing (CN); Wenlong Feng, Beijing (CN)

(73) Assignees: CHONGQING BOE OPTOELECTRONICS TECHNOLOGY CO., LTD., Chongqing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 17/280,667

(22) PCT Filed: Sep. 23, 2020

(86) PCT No.: PCT/CN2020/117039
§ 371 (c)(1),
(2) Date: Mar. 26, 2021

(87) PCT Pub. No.: WO2021/103785
PCT Pub. Date: Jun. 3, 2021

(65) Prior Publication Data
US 2022/0043315 A1  Feb. 10, 2022

(30) Foreign Application Priority Data
Nov. 28, 2019 (CN) .......................... 201911212220.X

(51) Int. Cl.
*G02F 1/1362* (2006.01)
*G02F 1/1368* (2006.01)

(52) U.S. Cl.
CPC ...... *G02F 1/136286* (2013.01); *G02F 1/1368* (2013.01)

(58) Field of Classification Search
CPC .................. G02F 1/134309; G02F 1/136286
See application file for complete search history.

(56) References Cited

U.S. PATENT DOCUMENTS 5,493,129 A * 2/1996 Matsuzaki ........ H01L 29/78669
257/E29.291
10,535,318 B2  1/2020 Du et al.
(Continued)

FOREIGN PATENT DOCUMENTS

CN  103676381 A  3/2014
CN  108121119 A  6/2018
(Continued)

OTHER PUBLICATIONS

Extended European Search Report dated Dec. 14, 2022, for corresponding European Application No. 20873342.8.

*Primary Examiner* — Lauren Nguyen
(74) *Attorney, Agent, or Firm* — Kinney & Lange, P.A.

(57) ABSTRACT

A display substrate is provided, including: a base substrate; a display area, and a peripheral area surrounding the display area on the base substrate, where a dummy pixel unit and a dummy data line are located in the peripheral area. The dummy pixel unit includes a thin film transistor including a first electrode and a second electrode. The first electrode is one of a source electrode and a drain electrode and is electrically connected to the dummy data line, and the second electrode is another of the source electrode and the drain electrode and includes a first portion and a second portion separated by a first opening. A display panel includ- (Continued)

ing the display substrate and an electronic device including the display substrate or the display panel are further provided.

20 Claims, 8 Drawing Sheets

(56) References Cited

U.S. PATENT DOCUMENTS

| | | |
|---|---|---|
| 10,670,930 B2 | 6/2020 | Jeong et al. |
| 2002/0047948 A1* | 4/2002 | Yoo .................. G02F 1/136286 |
| | | 349/43 |
| 2006/0033872 A1* | 2/2006 | Sasuga .............. G02F 1/133604 |
| | | 349/149 |
| 2016/0342048 A1* | 11/2016 | Huang ................. G02F 1/1345 |
| 2018/0011357 A1* | 1/2018 | Lee .................. H01L 29/41733 |
| 2018/0157114 A1 | 6/2018 | Park et al. |
| 2018/0188616 A1 | 7/2018 | Jeong et al. |
| 2019/0122626 A1 | 4/2019 | Du et al. |

FOREIGN PATENT DOCUMENTS

| | | |
|---|---|---|
| CN | 109426041 A | 3/2019 |
| CN | 210573114 U | 5/2020 |
| JP | 2010276665 A | 12/2010 |
| WO | 2019037440 A1 | 2/2019 |

* cited by examiner

A-A

B-B

DISPLAY SUBSTRATE HAVING DUMMY PIXEL, DISPLAY PANEL, AND ELECTRONIC DEVICE

CROSS REFERENCE TO RELATED APPLICATION(S)

The present disclosure is a Section 371 National Stage Application of International Application No. PCT/CN2020/117039, filed on Sep. 23, 2020, entitled "DISPLAY SUBSTRATE, DISPLAY PANEL, AND ELECTRONIC DEVICE", which claims priority to Chinese Patent Application No. 201911212220.X, filed with China National Intellectual Property Administration on Nov. 28, 2019, the content of which are incorporated herein by reference in their entirety.

TECHNICAL FIELD

The present disclosure relates to a field of display technology, and in particular to a display substrate, a display panel and an electronic device.

BACKGROUND

In a design of a liquid crystal display panel with thin film transistors (TFT-LCD), a process environment of a TFT device in a periphery area surrounding a display area is different from that of a TFT device in a middle of the display area, which may cause uneven display. Therefore, in practice, a certain number of dummy pixels may be designed around the display area if allowed by a dimension of a frame.

SUMMARY

The embodiments of the present disclosure provide a display substrate, including: a base substrate; a display area and a peripheral area surrounding the display area on the base substrate, wherein a dummy pixel unit and a dummy data line are located in the peripheral area, the dummy pixel unit includes a thin film transistor including a first electrode and a second electrode, the first electrode is one of a source electrode and a drain electrode and is electrically connected to the dummy data line, and the second electrode is another of the source electrode and the drain electrode and includes a first portion and a second portion separated by a first opening.

In some embodiments, the dummy pixel unit further includes a pixel electrode electrically connected to the second portion of the second electrode, and the thin film transistor further includes an active layer and a gate electrode; in a same thin film transistor, an orthographic projection of the gate electrode on the base substrate at least partially overlaps an orthographic projection of the active layer on the base substrate and at least partially overlaps an orthographic projection of the first portion of the second electrode on the base substrate.

In some embodiments, in a same thin film transistor, the orthographic projection of the active layer on the base substrate at least partially overlaps the orthographic projection of the first portion of the second electrode on the base substrate and does not overlap an orthographic projection of a second portion of the second electrode on the base substrate, and an orthographic projection of the first opening on the base substrate does not overlap the orthographic projection of the active layer on the base substrate and does not overlap the orthographic projection of the gate electrode on the base substrate.

In some embodiments, in a same thin film transistor, the orthographic projection of the active layer on the base substrate at least partially overlaps the orthographic projection of the first portion of the second electrode on the base substrate and at least partially overlaps the orthographic projection of the second portion of the second electrode on the base substrate, and the orthographic projection of the first opening on the base substrate falls into the orthographic projection of the active layer on the base substrate and the orthographic projection of the gate electrode on the base substrate.

In some embodiments, in a same thin film transistor, an orthographic projection of an edge of the first portion of the second electrode close to the first opening on the base substrate is aligned with an edge of the orthographic projection of the gate electrode on the base substrate.

In some embodiments, in a same thin film transistor, an orthographic projection of the gate electrode on the base substrate completely covers an orthographic projection of the first portion of the second electrode on the base substrate.

In some embodiments, in a same thin film transistor, an orthographic projection of the gate electrode on the base substrate partially overlaps an orthographic projection of the second portion of the second electrode on the base substrate.

In some embodiments, the second electrode further includes a third portion separated from the second portion by a second opening, an orthographic projection of each of the first opening and the second opening on the base substrate does not overlap the orthographic projection of the gate electrode on the base substrate and does not overlap the orthographic projection of the active layer on the base substrate, an orthographic projection of at least one of the first portion and the third portion of the second electrode on the base substrate at least partially overlaps the orthographic projection of the gate electrode on the base substrate and at least partially overlaps the orthographic projection of the active layer on the base substrate, and the second portion of the second electrode is electrically connected to the pixel electrode through a first via hole structure.

In some embodiments, the display substrate further includes a common electrode, an electrode extension layer electrically connected to the common electrode and the dummy data line is further located in the peripheral area, the electrode extension layer is made of a same material and arranged in a same layer as the first electrode, the second electrode and the dummy data line.

In some embodiments, both ends of the dummy data line are electrically connected to the electrode extension layer to form a conductive loop that passes through the dummy data line and the electrode extension layer.

In some embodiments, the display substrate further includes a common electrode and a connection layer, an electrode extension layer electrically connected to the common electrode is further located in the peripheral area, the connection layer is made of a same material and arranged in a same layer as the pixel electrode, and the connection layer is electrically connected to the common electrode through a second via hole structure and is electrically connected to the electrode extension layer through a third via hole structure.

In some embodiments, the common electrode includes a first common electrode extension portion and a second common electrode extension portion connected to each other, an extension direction of the first common electrode extension portion crosses an extension direction of the second common electrode extension portion, an orthographic projection of the connection layer on the base substrate at least partially overlaps an orthographic projection of the second common electrode extension portion on the base substrate, and an orthographic projection of the first common electrode extension portion on the base substrate at least partially overlaps an orthographic projection of the pixel electrode on the base substrate.

In some embodiments, the display substrate further includes a common electrode and a gate line, an electrode extension layer electrically connected to the common electrode is further located in the peripheral area, the electrode extension layer is made of a same material and arranged in a same layer as the first electrode, the second electrode and the dummy data line, the gate line is made of a same material and arranged in a same layer as the gate electrode, and an orthographic projection of the gate line on the base substrate overlaps an orthographic projection of the electrode extension layer on the base substrate.

In some embodiments, the electrode extension layer includes a hollow area, and an orthographic projection of the hollow area on the base substrate at least partially overlaps the orthographic projection of the gate line on the base substrate.

The embodiments of the present disclosure further provide a display panel, including the display substrate according to any one of the embodiments described above.

The embodiments of the present disclosure further provide an electronic device, including the display substrate or the display panel according to any one of the embodiments described above.

BRIEF DESCRIPTION OF THE DRAWINGS

In order to more clearly explain the technical solutions in the embodiments of the present disclosure, the drawings of the embodiments will be briefly introduced below. It should be noted that the drawings in the following description are only some embodiments of the present disclosure, and are not intended to limit the present disclosure.

DETAILED DESCRIPTION OF EMBODIMENTS

Figure 1A:
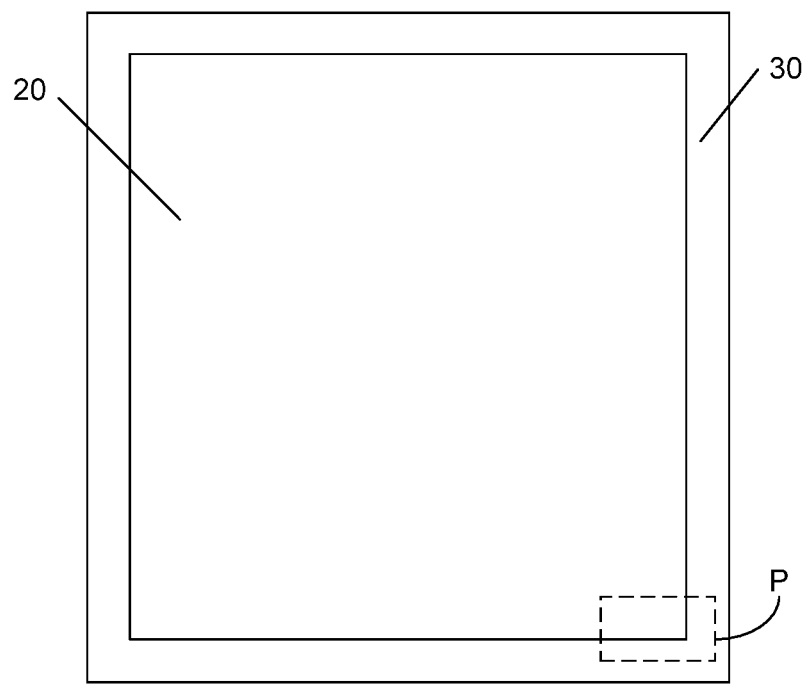
FIG. 1A shows a schematic diagram of a display substrate according to the embodiments of the present disclosure.

In order to make the objectives, technical solutions and advantages of the present disclosure more apparent, the embodiments of the present disclosure will be described below with reference to the drawings. It should be understood that the following description of the embodiments is intended to explain and illustrate a general idea of the present disclosure, and should not be construed as limiting the present disclosure. In the description and the drawings, the same or similar reference signs indicate the same or similar components or members. For clarity, the drawings are not necessarily drawn in proportion, and some known components and structures may be omitted in the drawings.

Unless otherwise defined, technical terms or scientific terms used in the present disclosure shall be of the general meaning understood by the ordinary skilled in the art. The words "first," "second," and the like used in the present disclosure do not denote any order, quantity or importance, but are used to distinguish different components. The word "a", "an" or "one" does not exclude a plurality. The words "comprising," "including" and the like indicate that the element or item preceding the word contains the elements or items as well as the equivalents listed following the word, but do not exclude other elements or items. The words "connected," "coupled," or the like are not limited to physical or mechanical connections, but may include electrical connections, whether direct or indirect. The words "upper", "lower", "left", "right", "top" or "bottom" and the like are only used to indicate relative positional relationship, and when the absolute position of the object described is changed, the relative positional relationship may also correspondingly changed. When an element such as a layer, a film, an area or a base substrate is referred to be located "above" or "below" another element, the element may be "directly" located "above" or "below" the other element, or there may be an intermediate element.

Figure 1B:
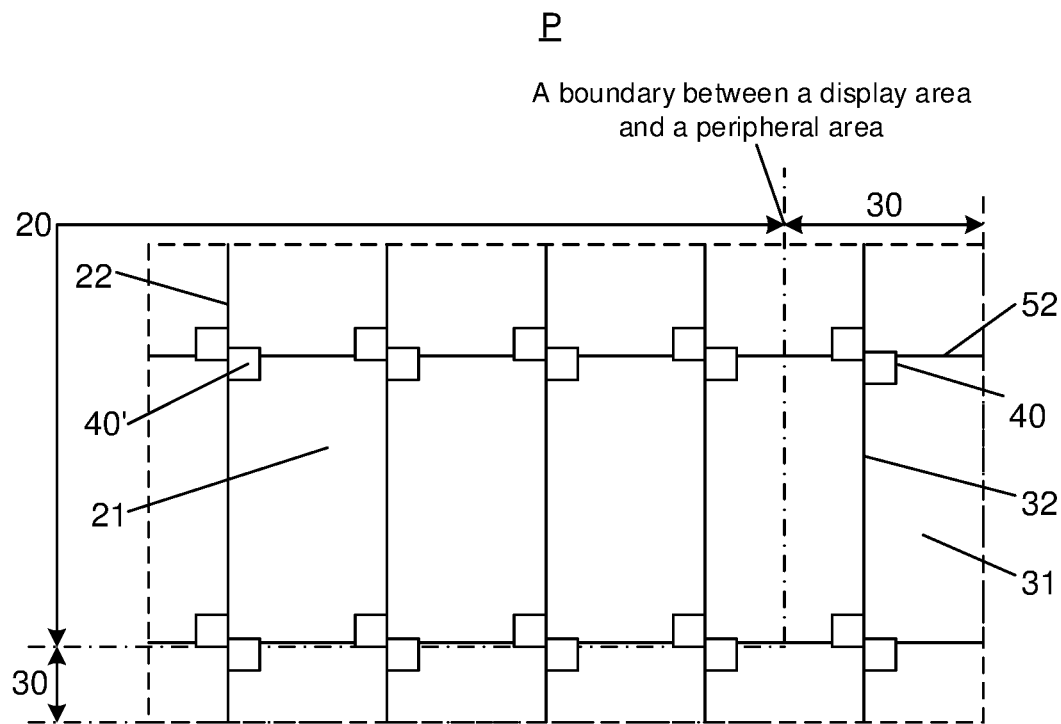
FIG. 1B shows a partial schematic diagram of a dotted box P in FIG. 1A.

The embodiments of the present disclosure provide a display substrate 100. FIG. 1A shows a schematic plan view of the display substrate 100, where a display area 20 and a peripheral area 30 are shown. FIG. 1B shows details of a part in a dotted box at the bottom right of FIG. 1A. In FIG. 1B, for clarity, a boundary between the display area 20 and the peripheral area 30 is indicated by a dashed line. The display substrate 100 includes a base substrate 10 (refer to cross-sectional views of FIG. 7 to FIG. 9), and the display area 20 and the peripheral area 30 on the base substrate 10. The peripheral area 30 surrounds the display area 20. The display area 20 is used to display images and may be provided with, for example, a plurality of pixel units 21 and structures such as data lines and gate lines. The peripheral area 30 is not used to display images, but may be used for wiring and the like, for example. A dummy pixel unit 31 and a dummy data line 32 may be located in the peripheral area 30. The dummy pixel unit 31 and the dummy data line 32 are similar in structure to a pixel unit 21 and a data line 22 in the display area 20, which helps to provide a pixel unit 21 in the display area 20 close to the peripheral area 30 with a similar environment to a pixel unit 21 in the display area 20 far away from the peripheral area 30. The dummy pixel unit 31 may include a thin film transistor 40.

Due to a limitation of a figure size, specific structures of a thin film transistor 40' in the display area 20 and the thin film transistor 40 in the peripheral area 30 are not shown in FIG. 1A and FIG. 1B. Examples of the specific structures are shown in FIG. 2 to FIG. 6.

Figure 3:
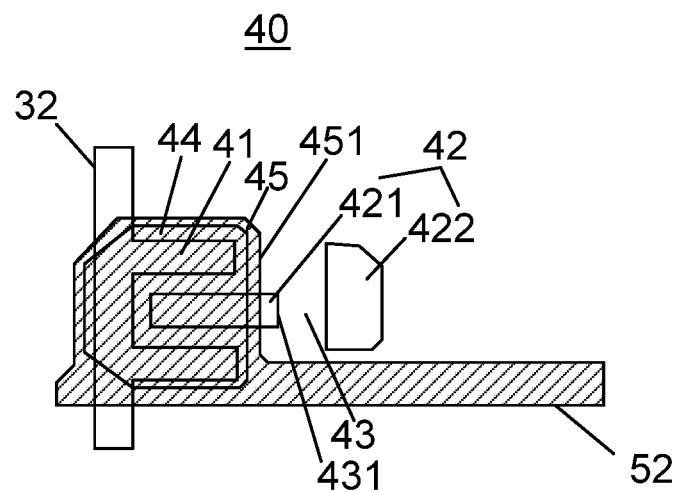
FIG. 3 shows a schematic structural diagram of a dummy thin film transistor in a peripheral area of a display substrate according to some embodiments of the present disclosure.
Figure 4:
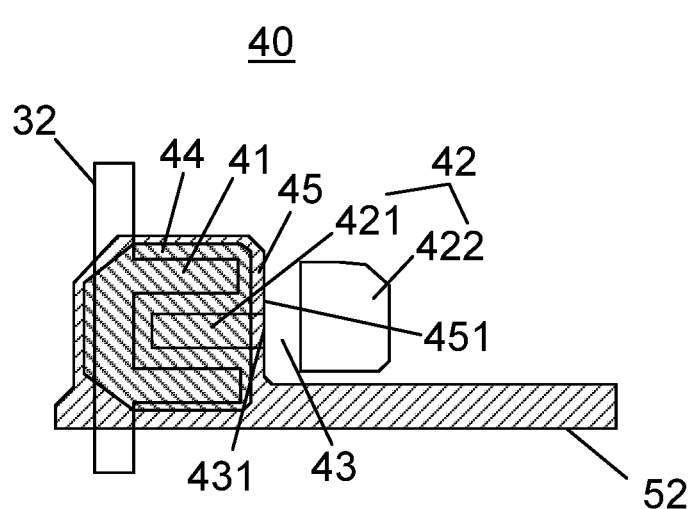
FIG. 4 shows a schematic structural diagram of a dummy thin film transistor in a peripheral area of a display substrate according to the embodiments of the present disclosure.
Figure 5:
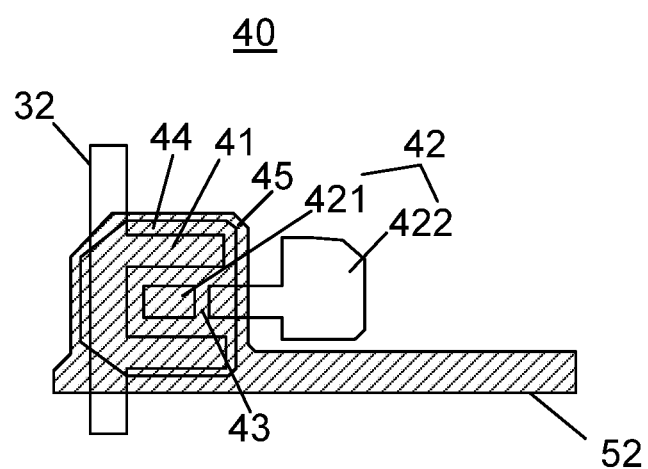
FIG. 5 shows a schematic structural diagram of a dummy thin film transistor in a peripheral area of a display substrate according to the embodiments of the present disclosure.

As shown in FIG. 3 to FIG. 5, the thin film transistor 40 may include a first electrode 41 and a second electrode 42. The first electrode 41 is electrically connected to the dummy data line 32, and the second electrode 42 includes a first portion 421 and a second portion 422 separated by an opening (in order to distinguish from the subsequent embodiments, this opening may be referred to as a first opening 43). In the following examples, a case that the first electrode 41 is a source electrode and the second electrode 42 is a drain electrode is illustrated by way of example. However, those skilled in the art should understand that the embodiments of the present disclosure are not limited thereto. For example, the first electrode 41 may be the drain electrode and the second electrode 42 may be the source electrode. In addition to the first electrode 41 and the second electrode 42 (one of the first electrode 41 and the second electrode 42 is the source electrode, and another of the first electrode 41 and the second electrode 42 is the drain electrode), the thin film transistor 40 may further include an active layer 44 and a gate electrode 45 electrically connected to a gate line 52.

In the embodiments of the present disclosure, the source electrode or the drain electrode of the thin film transistor 40 in the dummy pixel unit 31 is disconnected through an opening. In this case, even if a signal is input by the dummy data line 32, the thin film transistor 40 may fail to connect the dummy data line 32 to a pixel electrode 51, thus reducing a load of the gate line 52 electrically connected to the gate electrode 45 of the thin film transistor 40. This may not only reduce a power consumption caused by the dummy pixel unit 31, but also help improve a uniformity of brightness. As mentioned above, the dummy pixel unit 31 and the dummy data line 32 are provided to ensure that a pixel unit 21 in the display area 20 close to the peripheral area 30 has a similar process environment to a pixel unit 21 in the display area 20 far away from the peripheral area 30, and they do not need to realize a specific image display function. Therefore, in a case that the source electrode or the drain electrode of the thin film transistor 40 is disconnected through an opening (such as the first opening 43), the dummy data line 32 is also disconnected from the dummy pixel unit 31, so that the dummy data line 32 may also be used to realize some independent functions, such as conducting test signals, connecting common electrodes and so on. In the embodiments of the present disclosure, the gate line 52 may be electrically connected to the gate electrode 45 of the thin film transistor 40, and an orthographic projection of the gate line 52 on the base substrate 10 may cross an orthographic projection of the dummy data line 32 on the base substrate 10.

Moreover, the source electrode or the drain electrode of the thin film transistor 40 is disconnected only through an opening (such as the first opening 43), which has a little influence on an overall layer structure layout of the dummy pixel unit 31. In this way, the dummy pixel unit 31 may have a high degree of similarity in the layer structure with the pixel unit 21 in the display area 20, so as to achieve a purpose of providing a similar process environment for each pixel unit 21 in the display area 20. This is beneficial for maintaining the uniformity of the display brightness in the display area 20.

Figure 2:
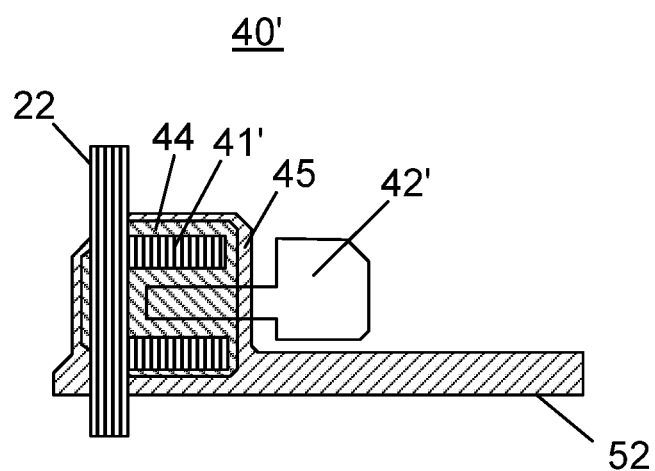
FIG. 2 shows a schematic structural diagram of a thin film transistor in a display area of a display substrate according to the embodiments of the present disclosure.

FIG. 2 shows an example of the thin film transistor 40' of the pixel unit 21 in the display area 20. As shown, in the thin film transistor 40', a first electrode 41' is electrically connected to the data line 22, and a second electrode 42' is complete and does not include an opening. In contrast, FIG. 3 to FIG. 5 respectively shows three examples of the thin film transistor 40 of the dummy pixel unit 31 in the peripheral area 30. In these three examples, the first electrode 41 is electrically connected to the dummy data line 32, but a position of the first opening 43 is different. In the example shown in FIG. 3 and the example shown in FIG. 4, an orthographic projection of the first opening 43 on the base substrate does not overlap an orthographic projection of the gate electrode 45 on the base substrate 10 and does not overlap an orthographic projection of the active layer 44 on the base substrate 10. However, in the example shown in FIG. 3, a part of an orthographic projection of the first portion 421 of the second electrode 42 on the base substrate 10 falls into the orthographic projection of the gate electrode 45 on the base substrate 10, and another part of the orthographic projection of the first portion 421 of the second electrode 42 on the base substrate 10 extends outside the orthographic projection of the gate electrode 45 on the base substrate 10. In the example shown in FIG. 4, the orthographic projection of the first portion 421 of the second electrode 42 on the base substrate 10 completely falls into the orthographic projection of the gate electrode 45 on the base substrate 10. In the example shown in FIG. 5, the orthographic projection of the first opening 43 on the base substrate 10 falls into the orthographic projection of the gate electrode 45 on the base substrate 10 and the orthographic projection of the active layer 44 on the base substrate 10, and an orthographic projection of a part of the second portion 422 of the second electrode 42 on the base substrate 10 falls into the orthographic projection of the gate electrode 45 on the base substrate 10 and the orthographic projection of the active layer 44 on the base substrate 10.

In the embodiments of the present disclosure, when the orthographic projection of the first opening 43 on the base substrate 10 falls into the orthographic projection of the gate electrode 45 on the base substrate 10 and the orthographic projection of the active layer 44 on the base substrate 10, a part of the second portion 422 of the second electrode 42 may overlap the gate electrode 45 and the active layer 44. In this case, compared with the case that the orthographic projection of the first opening 43 on the base substrate 10 falls outside the orthographic projection of the gate electrode 45 and the active layer 44 on the base substrate 10, a load of the gate line 52 may be greater. Therefore, the case that the orthographic projection of the first opening 43 on the base substrate 10 falls outside the orthographic projection of the gate electrode 45 and the orthographic projection of the active layer 44 on the base substrate 10 is more advantageous. In addition, it is desirable that a width of the first opening 43 is as narrow as possible, so that the structure of the dummy pixel unit 31 may be as similar as possible to the structure of the pixel unit 21 in the display area 20. This is helpful for reducing the load and improving the display uniformity.

In some embodiments, in a same thin film transistor, as shown in FIG. 3 to FIG. 6, the orthographic projection of the gate electrode 45 on the base substrate 10 at least partially (that is, partially or completely) overlaps the orthographic projection of the active layer 44 on the base substrate 10, and at least partially (that is, partially or completely) overlaps the orthographic projection of the first portion 421 of the second electrode 42 on the base substrate 10.

In other embodiments, in a same thin film transistor, as shown in FIG. 3 and FIG. 4, the orthographic projection of the active layer 44 on the base substrate 10 at least partially (that is, partially or completely) overlaps the orthographic projection of the first portion 421 of the second electrode 42 on the base substrate 10 and does not overlap the orthographic projection of the second portion 422 of the second electrode 42 on the base substrate 10.

In some embodiments, in a same thin film transistor, as shown in FIG. 5, the orthographic projection of the active layer 44 on the base substrate 10 at least partially (that is, partially or completely) overlaps the orthographic projection of the first portion 421 of the second electrode 42 on the base substrate 10, and at least partially (that is, partially or completely) overlaps the orthographic projection of the second portion 422 of the second electrode 42 on the base substrate 10.

In some embodiments, in a same thin film transistor, as shown in FIG. 3 to FIG. 6, the orthographic projection of the gate electrode 45 on the base substrate 10 at least partially (that is, partially or completely) overlaps the orthographic projection of the first portion 421 of the second electrode 42 on the base substrate 10.

In some embodiments, in a same thin film transistor, as shown in FIG. 4, an orthographic projection of an edge 431 of the first portion 421 of the second electrode 42 close to the first opening 43 on the base substrate is aligned with an edge 451 of the orthographic projection of the gate electrode 45 on the base substrate 10. In this way, the second portion 422 of the second electrode 42 does not overlap the gate electrode 45, and a width of the first opening 43 may be reduced as much as possible.

In some embodiments, in a same thin film transistor, as shown in FIG. 4 and FIG. 5, the orthographic projection of the gate electrode 45 on the base substrate 10 completely covers the orthographic projection of the first portion 421 of the second electrode 42 on the base substrate 10. This may prevent the first portion 421 of the second electrode 42 from extending excessively.

In other embodiments, in a same thin film transistor, as shown in FIG. 5, the orthographic projection of the gate electrode 45 on the base substrate 10 partially overlaps the orthographic projection of the second portion 422 of the second electrode 42 on the base substrate 10.

In some embodiments of the present disclosure, in a same thin film transistor, the orthographic projection of the gate electrode 45 on the base substrate 10 covers the orthographic projection of the active layer 44 on the base substrate 10. However, the embodiments of the present disclosure are not limited thereto.

Figure 6:
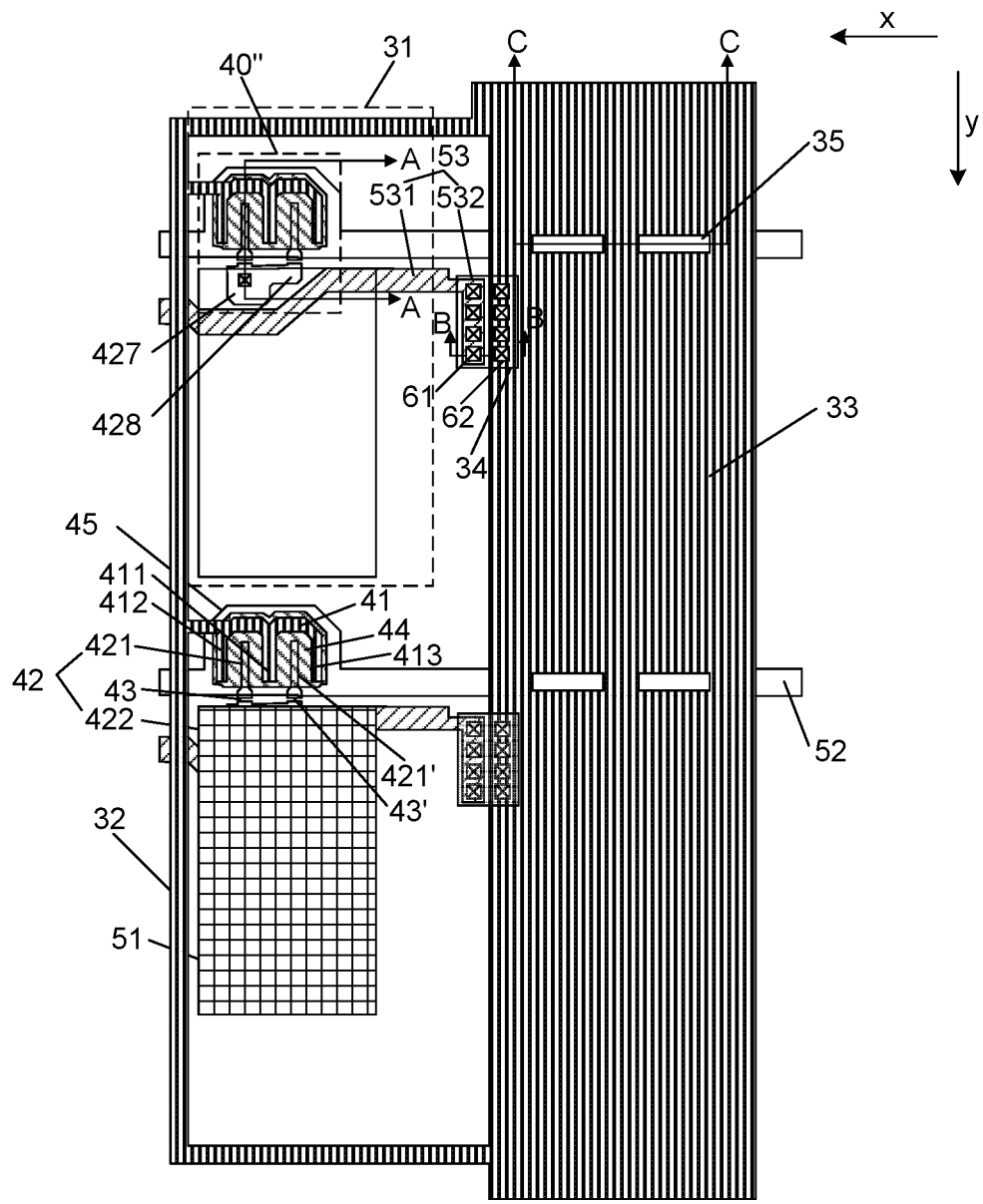
FIG. 6 shows a schematic diagram of a partial structure of a peripheral area in a display substrate according to the embodiments of the present disclosure.

FIG. 6 shows a schematic diagram of a partial structure of the peripheral area 30 in the display substrate according to the embodiments of the present disclosure, where two dummy pixel units 31 and a dummy data line 32 are shown. In the examples shown in FIG. 3 to FIG. 5, the structure of one thin film transistor 40 is shown. However, in the embodiments of the present disclosure, one dummy pixel unit 31 may include one thin film transistor, or may include a plurality of thin film transistors. Further, a thin film transistor may have a more complicated structure. In the example shown in FIG. 6, a thin film transistor 40" in the dummy pixel unit 31 may include a gate electrode 45, an active layer 44, a first electrode 41 and a second electrode 42. Two openings, that is, a first opening 43 and a second opening 43', are provided in the thin film transistor 40". The first electrode 41 is electrically connected to the dummy data line 32. The second electrode 42 includes a first portion 421, a second portion 422 and a third portion 421'. The first portion 421 and the second portion 422 are separated by the first opening 43, and the second portion 422 and the third portion 421' are separated by the second opening 43'. In the same thin film transistor 40", the third portion 421' may be, for example, farther away from the dummy data line 32 connected to the first electrode 41 than the first portion 421. In some embodiments, an extension direction of the third portion 421' of the second electrode 42 may be parallel to an extension direction of the first portion 421 of the second electrode 42.

In some embodiments, an orthographic projection of the first opening 43 on the base substrate does not overlap the orthographic projection of the gate electrode 45 on the base substrate 10 and does not overlap the orthographic projection of the active layer 44 on the base substrate 10. Similarly, in some embodiments, an orthographic projection of the second opening 43' on the base substrate does not overlap the orthographic projection of the gate electrode 45 on the base substrate 10 and does not overlap the orthographic projection of the active layer 44 on the base substrate 10. The orthographic projection of at least one of the first portion 421 of the second electrode 42 and the third portion 421' of the second electrode 42 on the base substrate may overlap the orthographic projection of the gate electrode 45 on the base substrate 10 and overlap the orthographic projection of the active layer 44 on the base substrate 10.

In some embodiments, the second portion 422 of the second electrode 42 may include a first section 427 adjacent to the first opening 43 and a second section 428 adjacent to the second opening 43'. In some embodiments, in the extension direction of the first portion 421 of the second electrode 42 (for example, y direction in FIG. 6), a width of the first section 427 is greater than a width of the second section 428, so that the orthographic projection of the second portion 422 of the second electrode 42 on the base substrate 10 is in an "L" shape as a whole. The first section 427 has a greater width, which is helpful to provide a via hole structure in the first section 427 to electrically connect with other conductive layers (for example, the pixel electrode 51).

In some embodiments, the first electrode 41 of the thin film transistor 40" may include a first extension portion 411, a second extension portion 412 and a third extension portion 413 that are electrically connected to each other. An extension direction of these three extension portions may be parallel to the extension direction of the first portion 421 or the third portion 421' of the second electrode 42. As shown in FIG. 6, the first extension portion 411 may be located between the first portion 421 of the second electrode 42 and the third portion 421' of the second electrode 42, the second extension portion 412 may be located on a side of the first portion 421 of the second electrode 42 away from the third portion 421' of the second electrode 42, and the third extension portion 413 may be located on a side of the third portion 421' of the second electrode 42 away from the first portion 421 of the second electrode 42. In some embodiments, as shown in FIG. 6, the dummy pixel unit 31 may further include a pixel electrode 51, and the second portion 422 of the second electrode 42 may be electrically connected to the pixel electrode 51. Compared with the structure of the thin film transistor shown in FIG. 3, the structure of the thin film transistor 40" described above may improve a load capacity of the gate line.

In the embodiments of the present disclosure, a width of the first opening 43 and the second opening 43' may be, for example, 2 micros to 5 micros.

Figure 7:
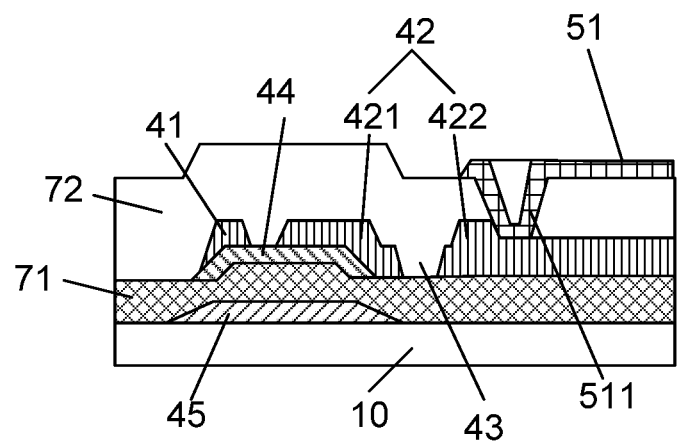
FIG. 7 shows a cross-sectional view taken along line AA in FIG. 6.

FIG. 7 shows a cross-sectional view taken along line AA in FIG. 6. A film layer structure of the thin film transistor 40" is shown more clearly in FIG. 7. As shown in FIG. 7, the display substrate 100 may include a first insulation layer 71 and a second insulation layer 72. The first insulation layer 71, such as a gate insulation layer, is located between the gate electrode 45 and the active layer 44. The second insulation layer 72, such as a planarization layer or an interlayer dielectric layer, is located between the thin film transistor 40 and a layer where the pixel electrode 51 is located. As an example, the first electrode 41 as well as the first portion 421, the second portion 422 and the third portion 421' of the second electrode 42 may be made of a same material (for example, a metal such as titanium and aluminum, or an alloy material) and arranged in a same layer. The first portion 421 and the second portion 422 of the second electrode 42 are separated by the first opening 43. The active layer 44 is located between the first insulation layer 71 and the layer where the first electrode 41 and the second electrode 42 are located. The pixel electrode 51 may be electrically connected to the second portion 422 of the second electrode 42, for example, through a first via hole structure 511. The first via hole structure 511 may be formed by forming a through hole in the second insulation layer 72 and then coating the through hole with a conductive layer. As shown in FIG. 7, the conductive layer (for example, a metal layer) in the first via hole structure 511 may be made of a same material and arranged in a same layer as the pixel electrode 51. The first via hole structure 511 may penetrate the second insulation layer 72 and contact the second portion 422 of the second electrode 42. As shown in FIG. 6, the display substrate 100 may further include a common electrode 53. The common electrode 53 and the pixel electrode 51 may apply a necessary voltage to the pixel unit to realize the display function. In some embodiments, an electrode extension layer 33 electrically connected to the common electrode 53 is further located in the peripheral area 30. The electrode extension layer 33 may increase an area of the common electrode 53 so as to improve signal stability. The electrode extension layer 33 may be arranged, for example, in a form of a large conductive layer as shown in FIG. 6. In some embodiments, the electrode extension layer 33 may be made of a same material and arranged in a same layer as the first electrode 41, the second electrode 42 and the dummy data line 32 so as to simplify the process.

Figure 8:
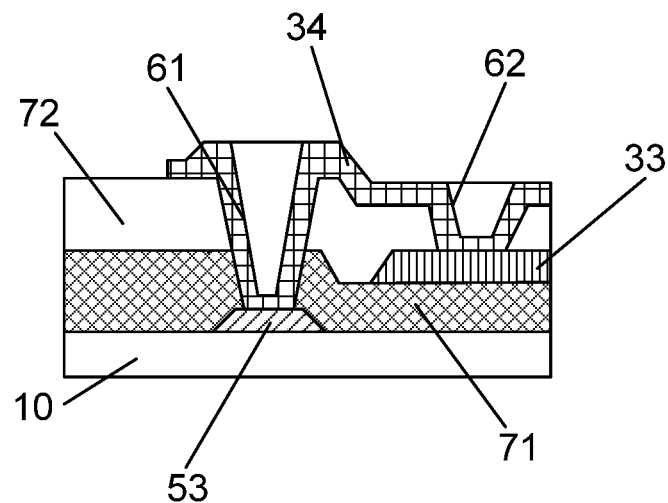
FIG. 8 shows a cross-sectional view taken along line BB in FIG. 6.

In some embodiments, a connection layer 34 may be further provided to facilitate an electrical connection between the common electrode 53 and the electrode extension layer 33. The connection layer 34 may be made of a same material and arranged in a same layer as the pixel electrode 51. The connection layer 34 is electrically connected to the common electrode 53 through a second via hole structure 61 and is electrically connected to the electrode extension layer 33 through a third via hole structure 62. The second via hole structure 61 may be formed by forming a through hole that passes through the first insulation layer 71 and the second insulation layer 72 and then coating the through hole with a conductive layer (for example, a metal layer). The third via hole structure 62 may be formed by forming a through hole that passes through the second insulation layer 72 and then coating the through hole with a conductive layer. As shown in FIG. 8, the conductive layer in the second via hole structure 61 may be made of a same material and arranged in a same layer as the connection layer 34. The second via hole structure 61 may penetrate the first insulation layer 71 and the second insulation layer 72 so as to contact the common electrode 53. Similarly, the third via hole structure 62 may be made of a same material and arranged in a same layer as the connection layer 34. The third via hole structure 62 may penetrate the second insulation layer 72 so as to contact the electrode extension layer 33. However, the embodiments of the present disclosure are not limited thereto. For example, the common electrode 53 may be electrically connected to the electrode extension layer 33 directly without the connection layer 34.

In some embodiments, as shown in FIG. 6, the common electrode 53 may include a first common electrode extension portion 531 and a second common electrode extension portion 532 that are connected to each other. The second via hole structure 61 is formed on the second common electrode extension portion 532 so as to electrically connect the second common electrode extension portion 532 and the connection layer 34. The second common electrode extension portion 532 may extend along an edge of the electrode extension layer 33 to better arrange the second via hole structure 61, especially when a plurality of second via hole structures 61 are provided. The first common electrode extension portion 531 of the common electrode 53 may extend from the second common electrode extension portion 532, substantially side by side with the gate line 52. This does not mean that the extension direction of the first common electrode extension portion 531 of the common electrode 53 is necessarily parallel to the extension direction of the gate line 52, and the first common electrode extension portion 531 may, for example, extend zigzag in order to bypass structures such as transistors (as shown in FIG. 6). For example, the first common electrode extension portion 531 may cross the dummy data line 32. As an example, an overall extension direction of the first common electrode extension portion 531 from the second common electrode extension portion 532 may be defined as a first direction (x direction in FIG. 6), and an extension direction of the second common electrode extension portion 532 is defined as a second direction (y direction in FIG. 6). In the example shown in FIG. 6, the first direction and the second direction form an angle of approximate ninety degrees, and the first common electrode extension portion 531 of the common electrode 53 and the second common electrode extension portion 532 of the common electrode 53 form an L-shaped structure. The design of this structure facilitates the electrical connection between the common electrode 53 and the connection layer 34. However, the embodiments of the present disclosure are not limited thereto. For example, the overall extension direction of the first common electrode extension portion 531 may not be perpendicular to the extension direction of the second common electrode extension portion 532.

In some embodiments, as shown in FIG. 6, an orthographic projection of the connection layer 34 on the base substrate 10 at least partially overlaps an orthographic projection of the second common electrode extension portion 532 on the base substrate 10. For example, the orthographic projection of the connection layer 34 on the base substrate 10 completely covers the orthographic projection of the second common electrode extension portion 532 on the base substrate 10. This facilitates an arrangement of the second via hole structure 61. The orthographic projection of the first common electrode extension portion 532 on the base substrate 10 may at least partially overlap the orthographic projection of the pixel electrode 51 on the base substrate 10. In some embodiments, the orthographic projection of the first common electrode extension portion 531 on the base substrate 10 crosses the orthographic projection of the dummy data line 32 on the base substrate 10.

In some embodiments, the electrode extension layer 33 is electrically connected to the dummy data line 32. This also allows the dummy data line 32 to be electrically connected to the common electrode 53, which further increases the actual area of the common electrode 53 and improves the signal stability.

As shown in FIG. 6, in some embodiments, both ends of the dummy data line 32 may be electrically connected to the electrode extension layer 33 to form a conductive loop that passes through the dummy data line 32 and the electrode extension layer 33. This structure may make a potential distribution on the common electrode 53 more uniform. For example, if the dummy data line 32 is disconnected and fails to form a conductive loop with the electrode extension layer 33, there may be a great potential difference across both sides of the opening of the dummy data line 32. When the dummy data line 32 and the electrode extension layer 33 form the conductive loop, this excessive potential difference may be weaken as much as possible, which is beneficial to realize the brightness uniformity of the display pixels in the display area 20.

In some embodiments, as shown in FIG. 6 to FIG. 8, the first insulation layer 71 may be located on a side of the common electrode 53 away from the base substrate 10 and a side of the electrode extension layer 33 facing the base substrate 10, and the second insulation layer 72 may be located between the electrode extension layer 33 and the connection layer 34 and located on a side of the active layer 44 away from the base substrate 10.

In some embodiments, as shown in FIG. 6, a gate line 52 is provided on the display substrate 100. The electrode extension layer 33 is made of a same material and arranged in a same layer as the first electrode 41, the second electrode 42 and the dummy data line 32. The gate line 52 is made of a same material and arranged in a same layer as the gate electrode 45. The orthographic projection of the gate line 52 on the base substrate 10 overlaps the orthographic projection of the electrode extension layer 33 on the base substrate 10. The overlapping of the electrode extension layer 33 and the gate line 52 is beneficial to the wiring on the display substrate 100, and also makes the electrode extension layer 33 have an area as large as possible to improve the signal stability.

Figure 9:
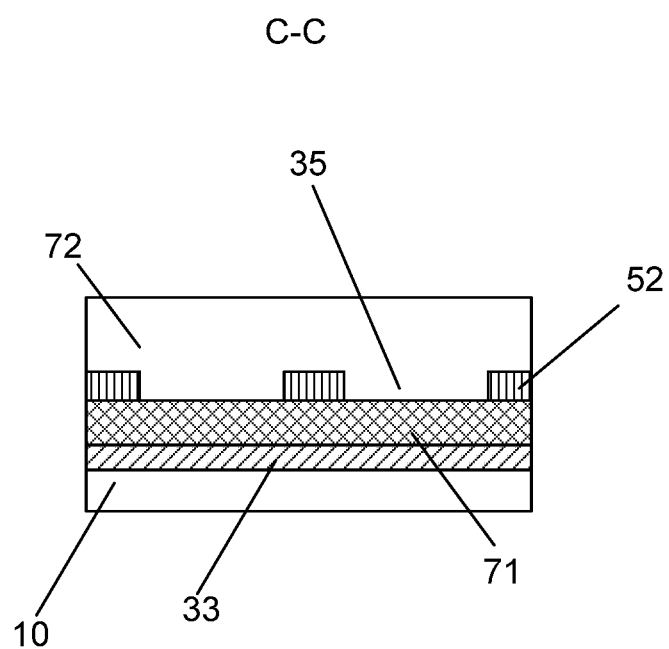
FIG. 9 shows a cross-sectional view taken along line CC in FIG. 6.

In some embodiments, as shown in FIG. 9, the electrode extension layer 33 may include a hollow area 35. An orthographic projection of the hollow area 35 on the base substrate 10 at least partially (that is, partially or completely) overlaps the orthographic projection of the gate line 52 on the base substrate 10. A conductive layer portion of the electrode extension layer 33 is removed at the hollow area 35. One or more hollow areas 35 are provided where the gate line 52 overlaps the electrode extension layer 33, which may reduce a parasitic capacitance between the electrode extension layer 33 (for example, the layer where the first electrode 41 and the second electrode 42 are located) and the layer where the gate line 52 is located, and avoid a significant increase of the parasitic capacitance due to an increase in the area of the conductive layer caused by the electrode extension layer 33, thereby preventing uneven brightness due to a difference in the parasitic capacitance.

Those skilled in the art should understand that although only two dummy pixel units 31 are shown in FIG. 6, the embodiments of the present disclosure are not limited thereto, and the display substrate 100 may include more dummy pixel units.

Figure 10:
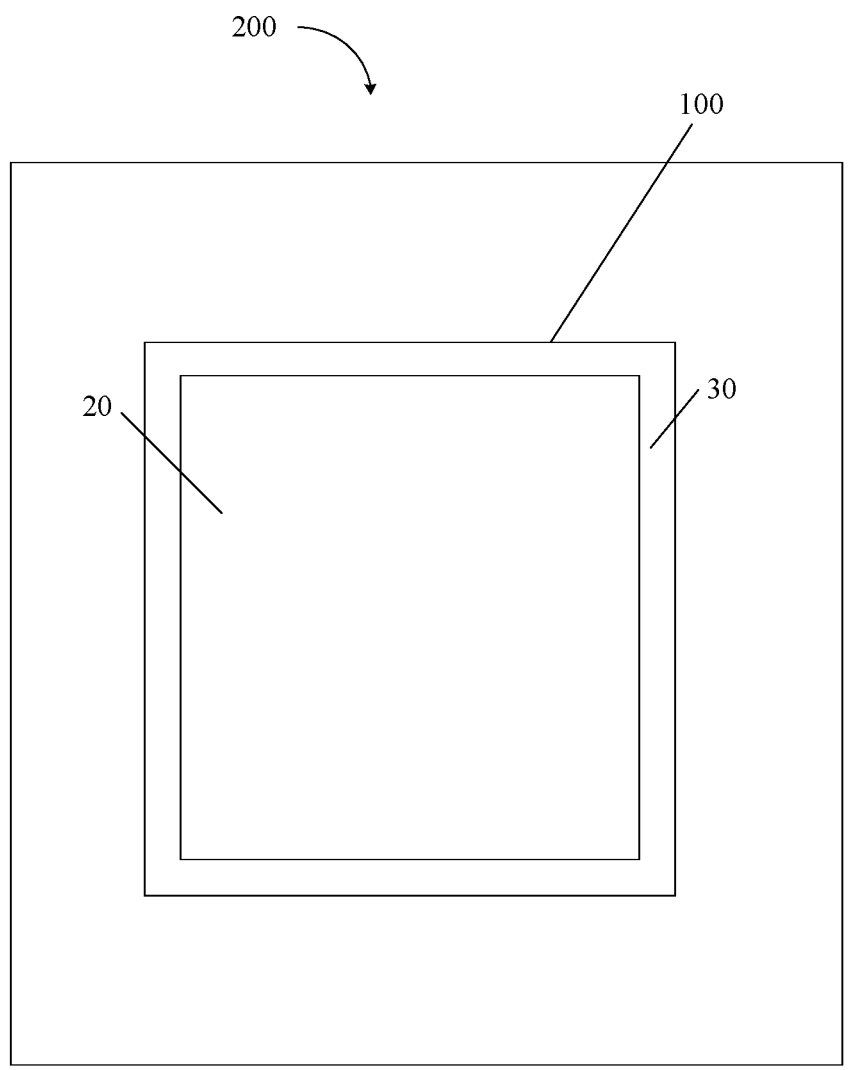
FIG. 10 shows a schematic diagram of an electronic device including a display substrate according to the embodiments of the present disclosure.

The embodiments of the present disclosure further provide a display panel, which may include the display substrate 100 according to any one of the embodiments described above. The display substrate and the display panel according to the embodiments of the present disclosure may be used not only in a thin film transistor type liquid crystal display device, but also in other types of display devices such as an organic light-emitting diode (OLED). The display panel in the embodiments of the present disclosure may be, for example, a thin film transistor type liquid crystal display panel, or may be any other type of display panel known in the art such as an organic light-emitting diode (OLED) display panel. It should be noted that the display device in the embodiments of the present disclosure may be any product or component with a display function, such as electronic paper, a mobile phone, a tablet computer, a television, a notebook computer, a digital photo frame, a navigator, and the like The embodiments of the present disclosure further provide an electronic device 200. As shown in FIG. 10, the electronic device 200 includes the display substrate 100 according to any one of the embodiments described above. The electronic device may be, for example, any display device, such as a smart phone, a wearable smart watch, smart glasses, a tablet computer, a television, a monitor, a notebook computer, a digital photo frame, a navigator, a car monitor, an e-book, and the like.

The "being arranged in a same layer" mentioned in the present disclosure means that the layers involved are formed at the same time in a same process step, but does not mean that these layers necessarily have a same thickness or height in a cross-sectional view. With the design of "being arranged in a same layer", the manufacturing process of the display substrate and the display panel may be simplified as much as possible.

Each conductive layer in the embodiments of the present disclosure may be made of a conductive metal or a non-metallic conductive material.

Although the present disclosure has been described with reference to the drawings, the embodiments disclosed in the drawings are intended to exemplify the embodiments of the present disclosure, and should not be understood as a limitation of the present disclosure. Dimension ratios in the drawings are only schematic and should not be construed as limiting the present disclosure.

The embodiments described above merely illustrate the principle and structure of the present disclosure, but are not used to limit the present disclosure. Those skilled in the art should understand that any changes and improvements made to the present disclosure without departing from the general idea of the present disclosure fall within the scope of the present disclosure. The protection scope of the present disclosure shall be determined by the scope defined by the claims of the present disclosure.

What is claimed is:

1. A display substrate, comprising:
   a base substrate; and
   a display area and a peripheral area surrounding the display area on the base substrate,
   wherein a dummy pixel unit and a dummy data line are located in the peripheral area;
   wherein the dummy pixel unit comprises a dummy thin film transistor comprising a first electrode and a second electrode, wherein the first electrode is one of a source electrode and a drain electrode and is electrically connected to the dummy data line;
   wherein the second electrode is the other of the source electrode and the drain electrode and comprises a first portion and a second portion separated by a first opening, and the first portion is located between the second portion and the first electrode; and wherein the dummy pixel unit further comprises a pixel electrode electrically connected to the second portion of the second electrode, and the first portion of the second electrode is electrically isolated from the pixel electrode, wherein a pixel unit and a data line are located in the display area, and the pixel unit comprises a thin film transistor comprising a third electrode and a fourth electrode, and wherein the third electrode is one of a source electrode and a drain electrode and is electrically connected to the data line, the fourth electrode is the other of the source electrode and the drain electrode and has no opening, and the pixel unit is configured to display an image, and wherein a pattern of an orthographic projection of end portions of the first electrode, the first portion, and the second portion on the base substrate is identical to a pattern of an orthographic projection of end portions of the third electrode and the fourth electrode on the base substrate; and wherein, when superimposed upon each other, a pattern of an orthographic projection of the first opening on the base substrate overlaps with a pattern of an orthographic projection of a middle portion of the fourth electrode on the base substrate.

2. The display substrate according to claim 1, wherein:
the dummy thin film transistor further comprises an active layer and a gate electrode,
in a same dummy thin film transistor, an orthographic projection of the gate electrode on the base substrate at least partially overlaps an orthographic projection of the active layer on the base substrate, and
the orthographic projection of the gate electrode on the base substrate at least partially overlaps an orthographic projection of the first portion of the second electrode on the base substrate.

3. The display substrate according to claim 2, wherein:
in the same dummy thin film transistor, the orthographic projection of the active layer on the base substrate at least partially overlaps the orthographic projection of the first portion of the second electrode on the base substrate and does not overlap an orthographic projection of the second portion of the second electrode on the base substrate, and
an orthographic projection of the first opening on the base substrate does not overlap the orthographic projection of the active layer on the base substrate and does not overlap the orthographic projection of the gate electrode on the base substrate.

4. The display substrate according to claim 2, wherein:
in the same dummy thin film transistor, the orthographic projection of the active layer on the base substrate at least partially overlaps the orthographic projection of the first portion of the second electrode on the base substrate and at least partially overlaps an orthographic projection of the second portion of the second electrode on the base substrate, and
an orthographic projection of the first opening on the base substrate falls into the orthographic projection of the active layer on the base substrate and the orthographic projection of the gate electrode on the base substrate.

5. The display substrate according to claim 2, wherein in the same dummy thin film transistor, an orthographic projection of an edge of the first portion of the second electrode close to the first opening on the base substrate is aligned with an edge of the orthographic projection of the gate electrode on the base substrate.

6. The display substrate according to claim 2, wherein in the same dummy thin film transistor, the orthographic projection of the gate electrode on the base substrate completely covers the orthographic projection of the first portion of the second electrode on the base substrate.

7. The display substrate according to claim 2, wherein in the same dummy thin film transistor, the orthographic projection of the gate electrode on the base substrate partially overlaps an orthographic projection of the second portion of the second electrode on the base substrate.

8. The display substrate according to claim 2, wherein:
the second electrode further comprises a third portion separated from the second portion by a second opening,
an orthographic projection of each of the first opening and the second opening on the base substrate does not overlap the orthographic projection of the gate electrode on the base substrate and does not overlap the orthographic projection of the active layer on the base substrate,
an orthographic projection of at least one of the first portion of the second electrode and the third portion of the second electrode on the base substrate at least partially overlaps the orthographic projection of the gate electrode on the base substrate and at least partially overlaps the orthographic projection of the active layer on the base substrate, and
the second portion of the second electrode is electrically connected to the pixel electrode through a first via hole structure.

9. The display substrate according to claim 1, further comprising a common electrode,
wherein an electrode extension layer electrically connected to the common electrode and the dummy data line is further located in the peripheral area, and the electrode extension layer is made of a same material and arranged in a same layer as the first electrode, the second electrode and the dummy data line.

10. The display substrate according to claim 9, wherein both ends of the dummy data line are electrically connected to the electrode extension layer to form a conductive loop that passes through the dummy data line and the electrode extension layer.

11. The display substrate according to claim 2, further comprising a common electrode and a connection layer,
wherein an electrode extension layer connected to the common electrode is further located in the peripheral area, the connection layer is made of a same material and arranged in a same layer as the pixel electrode, and the connection layer is electrically connected to the common electrode through a second via hole structure and is electrically connected to the electrode extension layer through a third via hole structure.

12. The display substrate according to claim 11, wherein:
the common electrode comprises a first common electrode extension portion and a second common electrode extension portion connected to each other, and an extension direction of the first common electrode extension portion crosses an extension direction of the second common electrode extension portion, and
wherein an orthographic projection of the connection layer on the base substrate at least partially overlaps an orthographic projection of the second common electrode extension portion on the base substrate, and an orthographic projection of the first common electrode extension portion on the base substrate at least partially overlaps an orthographic projection of the pixel electrode on the base substrate.

13. The display substrate according to claim 2, further comprising a common electrode and a gate line,
   wherein an electrode extension layer electrically connected to the common electrode is further located in the peripheral area, and the electrode extension layer is made of a same material and arranged in a same layer as the first electrode, the second electrode and the dummy data line; and
   wherein the gate line is made of a same material and arranged in a same layer as the gate electrode, and an orthographic projection of the gate line on the base substrate overlaps an orthographic projection of the electrode extension layer on the base substrate.

14. The display substrate according to claim 13, wherein the electrode extension layer comprises a hollow area, and an orthographic projection of the hollow area on the base substrate at least partially overlaps the orthographic projection of the gate line on the base substrate.

15. A display panel comprising the display substrate according to claim 1.

16. An electronic device comprising the display substrate according to claim 1.

17. An electronic device comprising the display panel according to claim 15.

18. The display substrate according to claim 2, further comprising a common electrode,
   wherein an electrode extension layer electrically connected to the common electrode and the dummy data line is further located in the peripheral area, and the electrode extension layer is made of a same material and arranged in a same layer as the first electrode, the second electrode and the dummy data line.

19. The display substrate according to claim 4, further comprising a common electrode and a connection layer,
   wherein an electrode extension layer connected to the common electrode is further located in the peripheral area, the connection layer is made of a same material and arranged in a same layer as the pixel electrode, and the connection layer is electrically connected to the common electrode through a second via hole structure and is electrically connected to the electrode extension layer through a third via hole structure.

20. The display substrate according to claim 4, further comprising a common electrode and a gate line,
   wherein an electrode extension layer electrically connected to the common electrode is further located in the peripheral area, and the electrode extension layer is made of a same material and arranged in a same layer as the first electrode, the second electrode and the dummy data line; and
   wherein the gate line is made of a same material and arranged in a same layer as the gate electrode, and an orthographic projection of the gate line on the base substrate overlaps an orthographic projection of the electrode extension layer on the base substrate.

* * * * *